United States Patent [19]

Edwards

[11] Patent Number: 4,497,556
[45] Date of Patent: Feb. 5, 1985

[54] PHOTOGRAPHIC STILL CAMERA

[76] Inventor: Evan A. Edwards, 2 Prospect Hill Rd., Pittsford, N.Y. 14534

[21] Appl. No.: 488,272

[22] Filed: Apr. 25, 1983

[51] Int. Cl.³ .......................... G03B 1/10; G03B 17/26
[52] U.S. Cl. ...................................... 354/212; 354/21; 354/275; 242/71.1
[58] Field of Search ............... 354/21, 212, 213, 275; 242/71.1, 71.2, 197

[56] References Cited

U.S. PATENT DOCUMENTS

| | | | |
|---|---|---|---|
| 1,469,485 | 10/1923 | Rivetta | 242/71.1 |
| 1,794,426 | 3/1931 | Taylor | 242/71.1 |
| 1,897,429 | 2/1933 | Hipke | 242/71.1 |
| 2,072,625 | 3/1937 | Rose | 242/71.1 |
| 2,236,917 | 4/1941 | Pollock | 242/71.1 |
| 2,521,956 | 9/1950 | Wallace et al. | 354/275 |
| 2,541,476 | 2/1951 | Mihalyi | 242/71.1 |
| 2,662,696 | 12/1953 | Nerwin | 242/71.2 |
| 3,037,719 | 6/1962 | Bemmann | 242/71.1 |
| 3,138,084 | 6/1964 | Harvey | 354/275 |
| 3,195,720 | 7/1965 | DeCanniere et al. | 242/71.1 |
| 3,282,527 | 11/1966 | D'Incerti | 242/71.1 |
| 3,384,318 | 5/1968 | Nerwin et al. | 242/71.1 |
| 3,460,449 | 8/1969 | Eagle | 354/275 |
| 3,482,681 | 12/1969 | Nerwin et al. | 242/71.2 |
| 3,614,012 | 10/1971 | Edelman | 242/71.2 |
| 3,650,489 | 3/1972 | Bresson et al. | 242/71.4 |
| 3,728,949 | 4/1973 | Edwards | 354/212 |
| 3,969,740 | 7/1976 | Hahn et al. | 242/71.2 |
| 4,024,557 | 5/1977 | Aoyama et al. | 242/71.1 |
| 4,146,321 | 3/1979 | Melillo | 354/275 |
| 4,221,479 | 9/1980 | Harvey | 242/71.1 |
| 4,290,680 | 9/1981 | Muramatsu et al. | 354/275 |

FOREIGN PATENT DOCUMENTS 1086493 11/1967 United Kingdom ............... 354/275

Primary Examiner—A. A. Mathews
Attorney, Agent, or Firm—Stonebraker, Shepard & Stephens

[57] ABSTRACT

A photographic still camera uses a film system 10 that includes a paper backed film strip wound in a supply coil 20 with the leading end of the paper backing 12 attached to a take-up spindle 31 in a take-up container 30 that can be separated by varying distances from supply coil 20. Supply coil 20 is held between flanges 21 having outwardly extending pins 29 eccentric to the supply coil axis, and take-up container 30 has a gear 46 on its take-up spindle 31. The camera cooperating with such a film system includes a supply recess 40 and a take-up recess 60 configured for respectively receiving supply coil 20 and take-up container 30. A camera gear 47 in take-up recess 60 meshes with take-up spindle gear 46 and rotates one revolution for each film advance. Opposite sides of the supply recess have ledges 41 arranged for engaging eccentric pins 29 on supply coil flanges 21 to orient supply coil 20. Ledges 41 enable supply coil 20 to roll back to take up any excess initial paper backing 12 extending between supply coil 20 and take-up container 30 when film system 10 is loaded into the camera. Ledges 41 also hold flanges 21 in proper position for rotationally unwinding the supply coil relative to the flanges as the film strip advances through the camera.

11 Claims, 6 Drawing Figures

PHOTOGRAPHIC STILL CAMERA

BACKGROUND

The 35 mm photographic still cameras that have been used for decades provide a large image area for high quality pictures, but otherwise have several serious problems. The 35 mm film strip is easily misloaded so that it does not advance in the camera. Failure to secure the leading end of the film strip so it winds on the take-up spindle is common, and it also happens that the film supply container can be canted and jammed under the camera cover to pinch the film so that the drive sprocket tears out perforations, rather than advancing the film. Since the user cannot see the film or observe its advance once the camera is closed, these errors can go undetected, and the user can operate the camera in the mistaken belief that pictures are being taken.

The 35 mm format camera also requires setting a frame counter, rewinding the film after exposure, and manually entering the film speed into the camera's exposure control system. These operations, along with manual loading and threading, all present opportunities for error. Many attempts have been made to automate some of the 35 mm camera functions, but no solution to these problems has been entirely satisfactory.

I have devised a photographic still camera and film system that afford the user an image area almost as large as 35 mm while eliminating manual operations and any chance for misloading the film in the camera. My camera and film system can accommodate any type of still camera film including transparencies compatible with existing slide mounts and projectors. Although my camera is simplified and uses more economical components for film loading and advance, the camera otherwise can use a wide variety of optical systems, shutters, and exposure control systems and can have different dimensions accommodating different operating equipment. My camera and film system greatly simplify the loading and unloading of film, practically eliminate chances for errors, automatically apprise the camera of the type and speed of film being used, and let the user know both the type of film in the camera and the state of its advancement.

SUMMARY OF THE INVENTION

My photographic still camera uses a film system that includes a paper backed film strip wound in a supply coil with a leading end of the paper backing attached to a take-up spindle in a take-up container that can be separated by variable distances from the supply coil. The supply coil is held between flanges having outwardly extending pins eccentric to the supply coil axis, and the take-up container has a gear on its take-up spindle.

In cooperation with such a film system, my camera has a supply recess and a take-up recess respectively configured for receiving the supply coil and the take-up container. A camera gear in the take-up recess meshes with the gear on the take-up spindle, and the camera can rotate the camera gear one revolution for each film advance. This gradually spreads the exposed images apart as the film strip winds on an increasing diameter on the take-up spindle.

Opposite sides of the supply recess have ledges arranged for engaging the eccentric pins on the supply coil flanges to orient the supply coil in the camera. Interaction between the eccentric pins and the ledges cause the supply coil to roll back and take up any excess initial paper backing extending between the supply coil and the take-up container when the film system is loaded into the camera. The ledges and the supply recess are arranged for holding the flanges in proper position for rotationally unwinding the supply coil relative to the flanges as the film strip advances through the camera.

These features lead to several important advantages. The camera becomes simpler, smaller, lighter, and less expensive by eliminating a metering sprocket, pawls, take-up clutch, rewind mechanism, frame counter, and ASA speed setting knob. Lack of these parts not only eliminates expense, but also shortens the camera longitudinally of the film strip; and lack of perforated edges on the film shortens the camera transversely of the film strip. The slightly smaller image area can shrink the camera's optical system; and all together these changes can markedly reduce size, weight, and expense relative to 35 mm cameras without any substantial reduction in image area and picture quality.

DRAWINGS

For simplicity, the drawings illustrate the film handling portion of a preferred embodiment of my camera, with optics, shutter, and other camera parts not involved in my invention being omitted.

DETAILED DESCRIPTION

Figure 1:
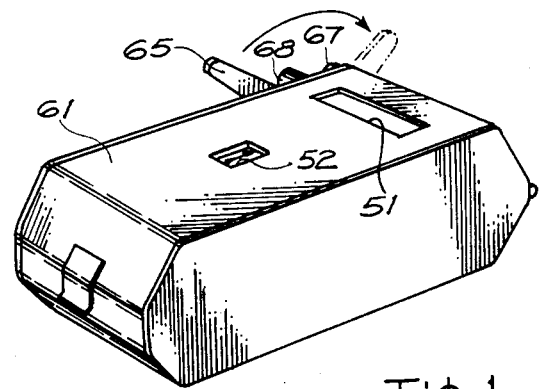
FIG. 1 is a perspective view of a preferred embodiment of the film handling portion of my camera with the camera back closed.

Film system 10 used in my camera includes a supply coil 20 of a paper backed film strip and a take-up container 30 in which the exposed film strip and backing paper are wound. Full details of film system 10 are disclosed in my U.S. patent application Ser. No. 488,270, filed Apr. 25, 1983 concurrently herewith), an entitled PHOTOGRAPHIC STILL CAMERA FILM SYSTEM, the disclosure of which is hereby fully incorporated into this application.

Generally, film system 10 provides a paper backed film strip about as wide as the distance between the perforations of 35 mm film, with image areas made on film system 10 being nearly as large as 35 mm image areas for equivalent picture quality.

From the point of view of a camera involved with loading, advancing, and unloading film system 10, its essential features are illustrated in the drawings. These include a supply coil 20 held between a pair of flanges 21 interconnected by axially extending staves 23. The leading end of paper backing strip 12 is taped to take-up spindle 31 in take-up container 30. Supply coil 20 and take-up container 30 are initially interconnected so that the user can separate them, pull them apart to a distance suitable for the camera, and load them into the camera in the orientation shown in FIG. 2.

Figure 2:
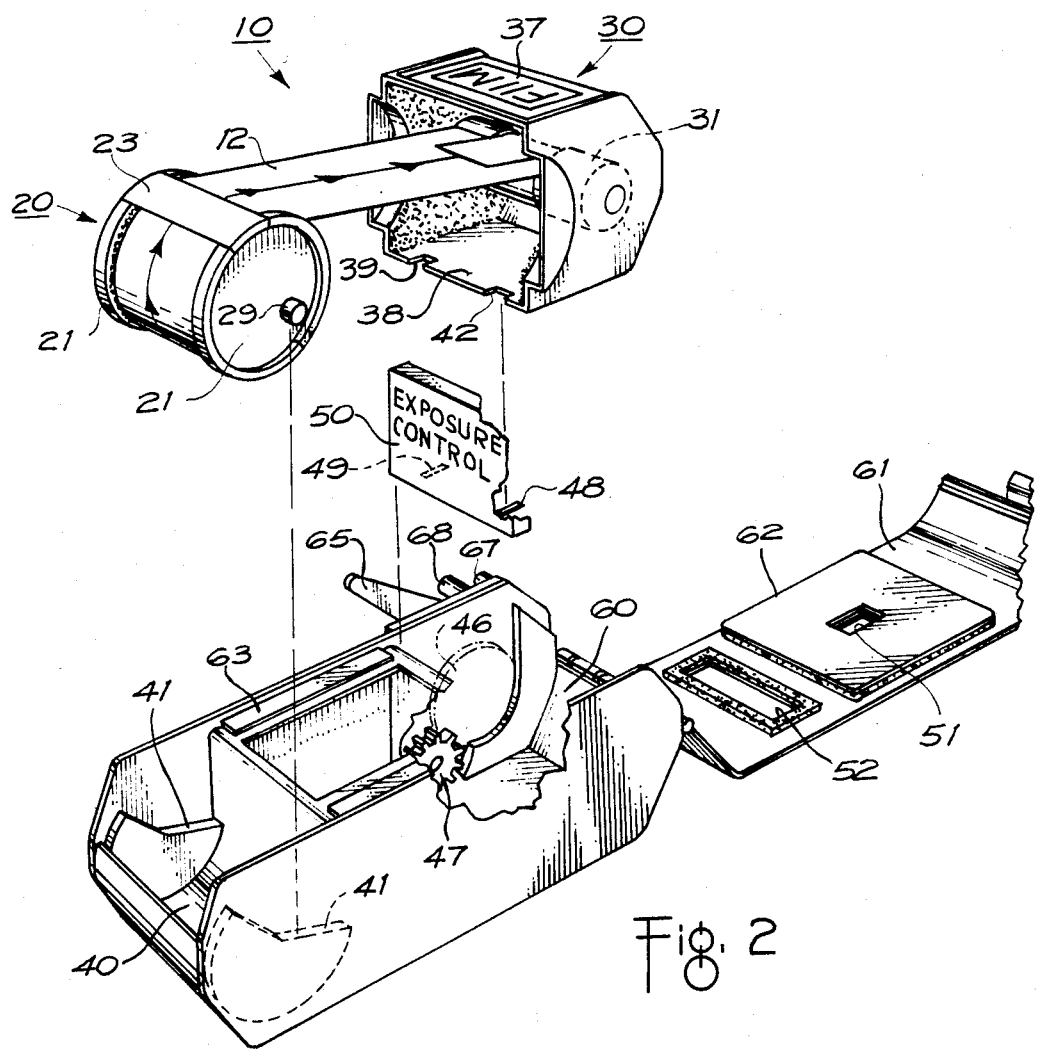
FIG. 2 is a partially cut-away, exploded perspective view of the camera portion of FIG. 1 with the camera back open and the film system included.

Once supply coil 20 and take-up container 30 are separated for loading, the user places them respectively in supply recess 40 and take-up recess 60 by lowering them in the orientation shown in FIG. 2. Take-up container 30 fits comfortably in take-up recess 60 where it is shaped to fit only in the proper orientation and remain immobile during film advance. Gear 46 on take-up spindle 31 meshes with camera gear 47 for advancing the film as explained below.

The orientation of supply coil 20 in supply recess 40 is more complex. Flanges 21 preferably bear outwardly extending projections or pins 29 that are aligned with each other on an axis eccentrically spaced from the axis of coil 20. Eccentric pins 29 support and orient supply coil 20 within recess 40, hold flanges 21 against rotation as coil 20 is unwound, and allow flanges 21 to roll back with coil 20 to take up any excess paper extending between supply coil 20 and take-up container 30 as film system 10 is loaded into the camera. These functions are best shown in FIGS. 5 and 6.

Opposite ends of recess 40 have opposed ledges 41 that preferably slope downward toward the output side of recess 40 and are located adjacent flanges 21 for engaging eccentric pins 29. As the user lowers supply coil 20 into recess 40, pins 29 engage ledges 41 and can be lowered into recess 40 only as far as ledges 41 permit. Pins 29 are eccentric to the axis of coil 20 and are preferably disposed at about 4 or 5 o'clock as shown in FIGS. 2 and 5 when supply coil 20 is detached and pulled away from take-up container 30 and lowered directly into camera recess 40. This makes pins 29 engage ledges 41 before flanges 21 and coil 20 fully enter recess 40. The engagement of pins 29 with ledges 41 as coil 20 is lowered into recess 40 forces flanges 21 and coil 20 to rotate counterclockwise as viewed in FIGS. 5 and 6 as coil 20 and flanges 21 move to the bottom of recess 40 and pins 29 rotate to about a 3 o'clock position.

This counterclockwise roll back takes up any excess backing paper 12 that may have been unwound when supply coil 20 and take-up container 30 are separated for loading into the camera. If no such excess paper exists, the supply coil roll back is accompanied by unwinding a suitable length of backing paper 12 from supply coil 20.

Figure 5:
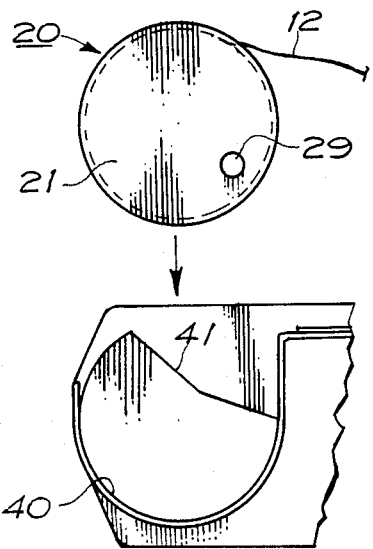
FIGS. 5 and 6 are partially schematic, fragmentary views showing the interaction between the supply coil and the camera's supply coil recess.
Figure 6:
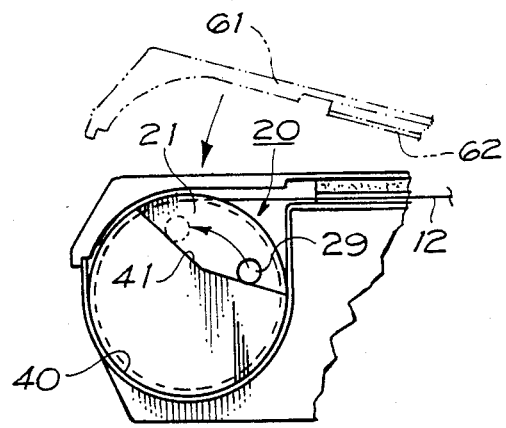

The engagement of pins 29 with ledges 41 also leaves supply coil 20 free to roll further back in a counterclockwise direction as viewed in FIGS. 5 and 6 to reduce any slack from further excess backing paper 12 extending to take-up container 30. In doing this, flanges 21 can rotate counterclockwise while pins 29 rotate away from ledges 41 toward a 12 or 11 o'clock position as shown by the arrow in FIG. 6.

Once film system 10 is loaded into the camera, camera cover or back 61 is closed. This brings a conventional pressure plate 62 to bear against the back of backing paper 12 to press the film flat in the camera's gate 63. Camera back 61 also preferably includes a window 51 for viewing frame markings on paper backing 12 so that the user can observe film advance and see which frame is positioned for exposure. Another window 52 is preferred in camera back 61 for viewing a label 37 on take-up container 30 indicating film speed and type.

The camera also preferably has an exposure control system 50 that is generally known and schematically illustrated. It includes a pair of switches 48 and 49 disposed in the bottom of take-up recess 60 to sense notches 39 or 42 on the bottom 38 of take-up container 30 for automatically apprising the exposure control system 50 of the film speed and type. Other discontinuities or distinctions can be substituted for notches 39 and 42, and many different arrangements of sensing switches 48 and 49 are possible. It is especially advantageous that exposure control system 50 be able to determine automatically the type of film used in system 10, because the camera can then automatically increase the exposure for color print film compared to the standard exposure for color transparencies.

Figure 3:
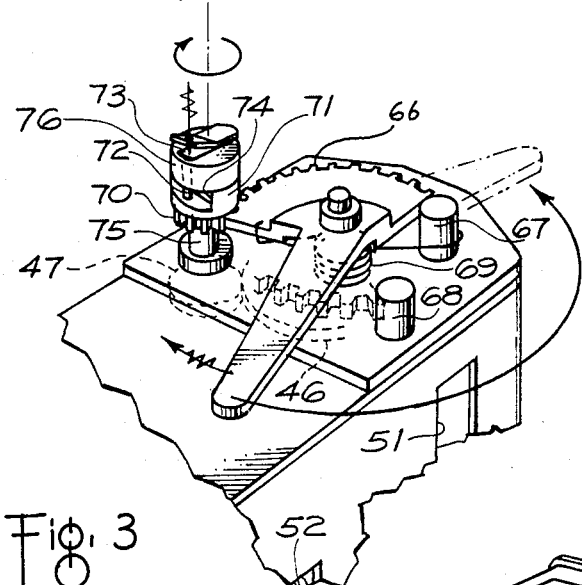
FIG. 3 is a fragmentary perspective view of a winding lever drive for turning a camera gear for each film advance.
Figure 4:
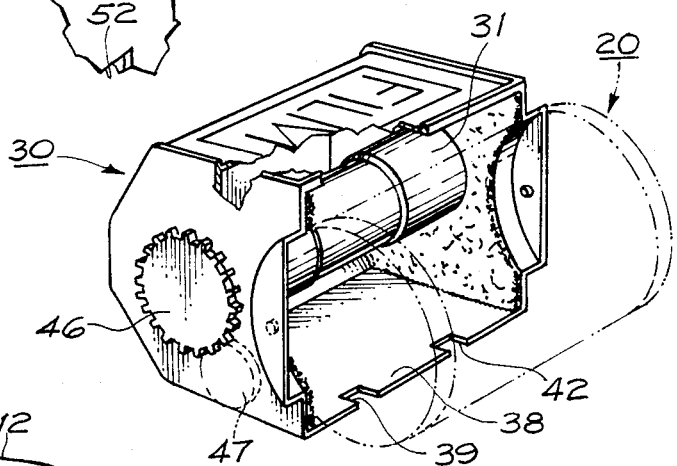
FIG. 4 is a partially cut-away, perspective view of a preferred embodiment of take-up container showing the take-up spindle gear meshed with a camera gear shown in broken lines.

Next comes advancement of the film, which is preferably accomplished by rotating camera gear 47 one revolution for each film advance. This can be done with a manual winding lever 65 as illustrated or with a motorized advance as is generally known. There are many drive variations that can turn a camera gear one revolution for each film advance, and a workable example of one is shown in FIG. 3.

Winding lever 65 rotates a sector gear 66 through an arc determined by a pair of stops 67 and 68. A spring 69 returns winding lever 65 and gear 66 to the solid-line home position after each advance.

Sector gear 66 meshes with gear 70, and gears 66 and 70 have a suitable number of teeth for turning gear 70 one revolution for each arcuate advance of gear 66. Gear 70 and a cam 71 rotate freely on shaft 75, which has a head 76 carrying a follower pin 72 biased downward against cam 71 by a leaf spring 73. As gear 66 advances, it turns gear 70 and stop 74 of cam 71 against follower 72 to rotate follower 72, head 76, and shaft 75 one revolution. As gear 66 moves back to its home position, cam 71 rotates under follower pin 72 without turning shaft 75. Camera gear 47 is mounted on shaft 75 so that it also advances one revolution with each advance of winding lever 65.

The first several advances wind the leading portion of backing paper 12 on take-up spindle 31 to bring the film strip into exposure position in the camera gate 63. Then twenty successive advances can produce 20 exposures that are variably spaced along the film strip because of the increasing winding diameter on take-up spindle 31. After the twentieth exposure, a few more advances wind up the trailing portion of the backing paper on the take-up coil, which is then stored light tight in take-up container 30. The user then opens camera back 61, removes take-up container 30 for processing the exposed film, discards flanges 21 and staves 23 that held the supply coil, and reloads the camera.

I claim:

1. A photographic still camera arranged for using a film system comprising:
    a. a paper backed film strip wound in a supply coil;
    b. a leading end of a paper backing for said film strip being attached to a take-up spindle in a take-up container that is variably separable from said supply coil;
    c. said supply coil being held between flanges having outwardly extending pins eccentric to the supply coil axis; and
    d. said take-up container having a gear on said take-up spindle;

said camera comprising:
    1. a supply recess configured for receiving said supply coil;
    2. a take-up recess configured for receiving said take-up container;

3. a camera gear in said take-up recess arranged for meshing with said gear on said take-up spindle;
4. means for rotating said camera gear one revolution for each film advance;
5. opposite sides of said supply recess having ledges arranged for engaging said eccentric pins to orient said supply coil, said ledges being configured for enabling said supply coil to roll back to take up any excess initial paper backing extending between said supply coil and said take-up container when said film system is loaded into said camera; and
6. said ledges and said supply recess being arranged for holding said flanges in position for rotationally unwinding said supply coil relative to said flanges as said film strip advances through said camera.

2. The camera of claim 1 wherein said camera gear is arranged for turning said take-up spindle gear a predetermined and unvarying portion of a revolution for each film advance.

3. The camera of claim 1 wherein said camera gear has a predetermined number of teeth less than a number of teeth on said take-up spindle gear so that one revolution of said camera gear for each film advance turns said take-up spindle gear a predetermined and unvarying portion of a revolution for each film advance.

4. The camera of claim 3 wherein said camera gear has 13 teeth and said take-up spindle gear has 20 teeth.

5. The camera of claim 1 including an exposure control system having means for sensing a surface region of said take-up container formed to distinguish between negative and positive type film in said supply coil so that said exposure control system can automatically adjust exposure for negative and positive type film.

6. The camera of claim 1 wherein said ledges in said supply recess have regions that incline downwardly toward an output side of said supply recess.

7. The camera of claim 6 wherein said camera gear has a predetermined number of teeth less than a number of teeth on said take-up spindle gear so that one revolution of said camera gear for each film advance turns said take-up spindle gear a predetermined and unvarying portion of a revolution for each film advance.

8. The camera of claim 7 wherein said camera gear has 13 teeth and said take-up spindle gear has 20 teeth.

9. The camera of claim 8 including an exposure control system having means for sensing a surface region of said take-up container formed to distinguish between negative and positive type film in said supply coil so that said exposure control system can automatically adjust exposure for negative and positive type film.

10. The camera of claim 6 wherein said camera gear is arranged for turning said take-up spindle gear a predetermined and unvarying portion of a revolution for each film advance.

11. The camera of claim 10 including an exposure control system having means for sensing a surface region of said take-up container formed to distinguish between negative and positive type film in said supply coil so that said exposure control system can automatically adjust exposure for negative and positive type film.

* * * * *